Feb. 20, 1968   J. H. PURYEAR   3,369,776
REVOLVING JET AIR INTAKE GUARD
Filed Oct. 18, 1965   3 Sheets-Sheet 1

REVOLVING JET AIR IN-TAKE GUARD

INVENTOR:

JOSEPH H. PURYEAR

United States Patent Office 3,369,776
Patented Feb. 20, 1968

3,369,776
REVOLVING JET AIR INTAKE GUARD
Joseph Harlon Puryear, 1908 2nd St.,
Bakersfield, Calif. 93304
Filed Oct. 18, 1965, Ser. No. 497,149
4 Claims. (Cl. 244—53)

This invention relates to jet aircraft motors. It is designed to prevent birds from being sucked into jet motors and causing all of these unnecessary airplane crashes.

The object of the rotating grill is to roll any birds that get against it off to the outside edge.

The object of the heavy outside grill is to prevent a large bird, such as a buzzard, from flying into the air intake and collapsing the rotating ball.

The object of the ¼" spears on the rotating ball are to rake the birds off if they are sucked to the ball too tightly.

The object of the holes in the side of the cowling are for extra air intake. In case the rotation grill was to clog up with a swarm of birds, the motor would have enough air intake through these holes to make it to the nearest landing field.

Still additional objects, benefits, and advantages of this invention will become evident from a study of the following detailed description taken in conjunction with the accompanying drawing, in which.

Figure 1:
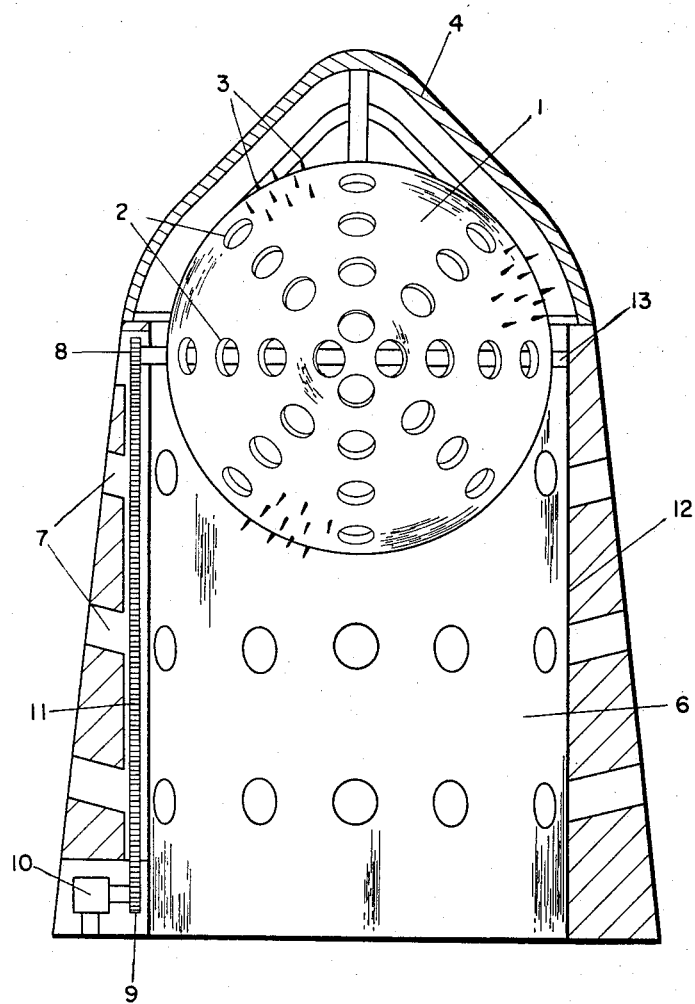
FIGURE 1 is a side view of a revolving jet air intake guard.
Figure 2:
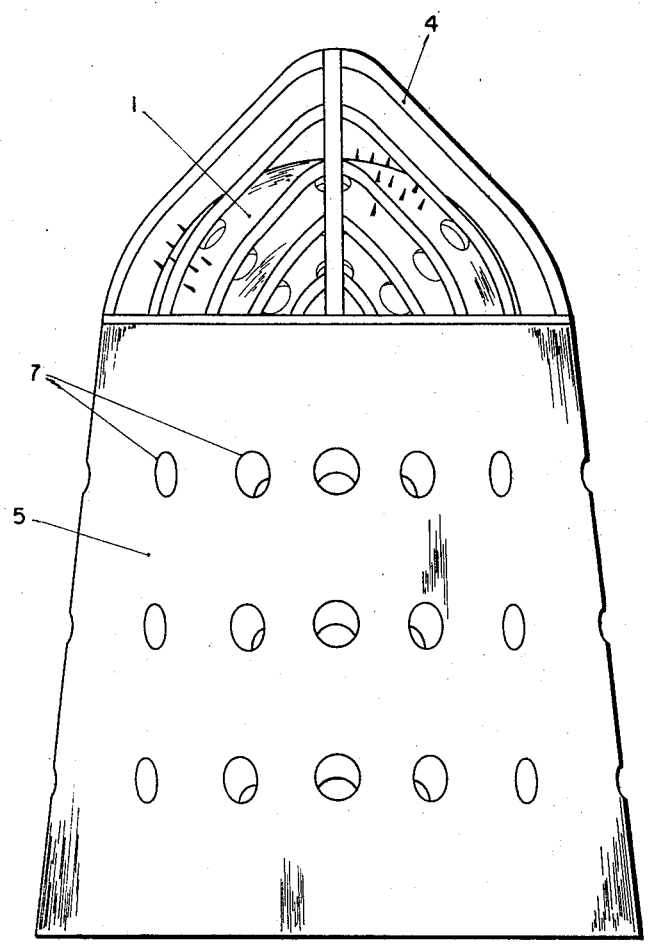
FIGURE 2 is a top view of a revolving jet air intake guard.
Figure 3:
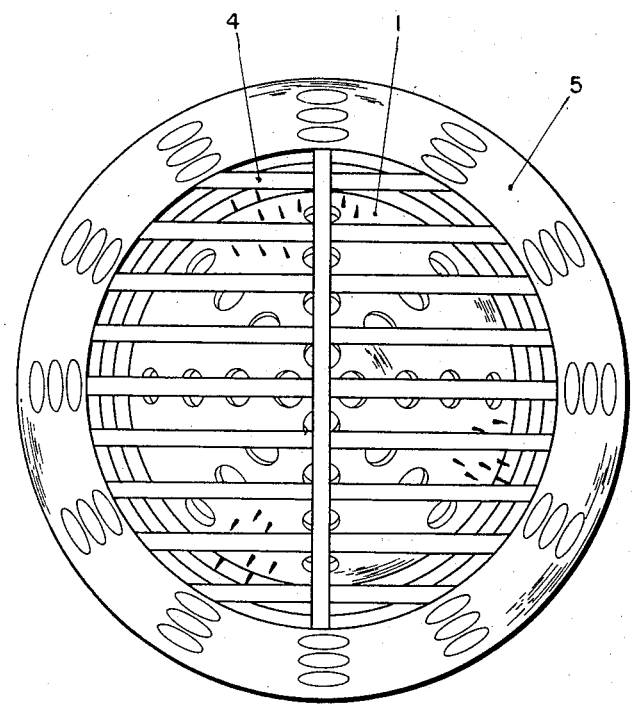
FIGURE 3 is an end view of a revolving jet air intake guard.

Referring now specifically to the drawing, the revolving jet air intake guard is shown to include a hollow aluminum ball 1 containing holes 2 for air intake, and little points or spears 3 approximately ¼" long to rake off debris that adheres to the hollow ball 1 as it rotates slowly. The hollow ball 1 is mounted into the end of an aluminum casing 6. The casing 6 contains holes 7 which join together to the outside cowling 5 with metal tubes for additional air intake. The hollow ball 1 is protected from large objects such as buzzards by a grill 4. The hollow ball 1 is rotated slowly on a shaft 13, driven by an electric motor 10 which is connected by a link chain 11 to two sprockets 8 and 9. One sprocket 8 is attached to the shaft 13 that is anchored to and goes through the hollow ball 1. The other sprocket 9 is attached to the low speed electric motor 10.

The electric motor 10 should have two or three speeds forward and possibly one speed in reverse.

The aluminum casing 6 is reinforced by ribs 12 for strength.

The operation of this device will now be readily understood. This structure, when attached to the jet opening on a plane should eliminate obstacles from passing through to the jet motor and killing the motor. The hollow ball with the holes in it, and the spears on it, should run slowly and continuously. Also, it should have a slight clearance from inside the jet air intake wall of approximately ¼".

While this invention has been described with particular reference to the construction shown in the drawing and while various changes may be made in the detailed construction, it shall be understood that such changes shall be within the spirit and scope of the present invention as defined by the appended claims.

Having thus completely and fully described the invention, what is now claimed as new and desired to be protected by Letters Patent of the United States is:

1. In an aircraft jet engine, a jet air intake for filtering out debris comprising, in combination; a casing for said engine forming a primary air intake at the forward end thereof, said casing having auxiliary air intake holes, a metal shaft rotatably mounted at either end within said casing and extending across said primary intake, a hollow ball mounted on said shaft for rotation therewith, said ball including a plurality of holes through which air may pass and a plurality of metal spears mounted thereon, a grill mounted on said casing and extending upstream of said ball across said primary intake, a motor having a plurality of forward speeds and one reverse speed to drive said shaft, two chain sprockets mounted on said motor and said shaft respectively, and a small link chain joining said sprockets for driving said shaft.

2. A revolving jet air intake guard as set forth in claim 1, wherein said rotating hollow ball is adapted to cooperate with said grill to eliminate obstacles from passing through to the motor.

3. A revolving jet air intake guard as set forth in claim 2, wherein said spears on the hollow ball are ¼" long and adapted to rake off any debris that may accumulate as it rotates.

4. A revolving jet air intake guard as set forth in claim 3, wherein said auxiliary holes are designed to give the motor enough air intake, if the ball was to plug up with a swarm of birds, to make a safe landing at the nearest airport.

References Cited
UNITED STATES PATENTS 3,121,545   2/1964   Meletion _____ 244—53

MILTON BUCHLER, *Primary Examiner.*

FERGUS S. MIDDLETON, *Examiner.*

B. BELKIN, *Assistant Examiner.*